United States Patent

Koivunen

[15] 3,685,619

[45] Aug. 22, 1972

[54] FULLY COMPENSATED BRAKE ANTI-LOCK SENSOR

[72] Inventor: Erkki A. Koivunen, Livonia, Mich.

[73] Assignee: General Motors Corporation, Detroit, Mich.

[22] Filed: March 8, 1971

[21] Appl. No.: 121,720

[52] U.S. Cl. .......................... 188/181 A, 303/21 CG
[51] Int. Cl. ............................................... B60t 8/12
[58] Field of Search ...... 188/180, 181 A; 303/21 CG, 303/21 F

[56] References Cited

UNITED STATES PATENTS 3,441,320    4/1969    Flory................188/181 A X
3,603,649    9/1971    Wilson................188/181 A Primary Examiner—Duane A. Reger
Attorney—W. E. Finken and D. D. McGraw

[57] ABSTRACT

A vehicle brake anti-lock sensor having a wheel speed driven rotary member, an inertia weight, a cam sleeve connected to the rotary member by a roller and ramp cam arrangement and to the inertia weight by a clutch having a torque capacity proportional to the linear deceleration of the inertia weight, and a modulator actuating means responsive to relative movement between the rotary member and cam sleeve. Upon braking and consequent wheel speed reduction, the torque induced by rotary inertia of the weight acts through the cam arrangement to move the cam sleeve relative to the rotary member while the linear inertia induced force opposes movement of the cam sleeve. The clutch permits the inertia weight to overrun the cam sleeve after movement relative to the rotary member so as to sustain the inertia of the weight.

4 Claims, 5 Drawing Figures

PATENTED AUG 22 1972
3,685,619
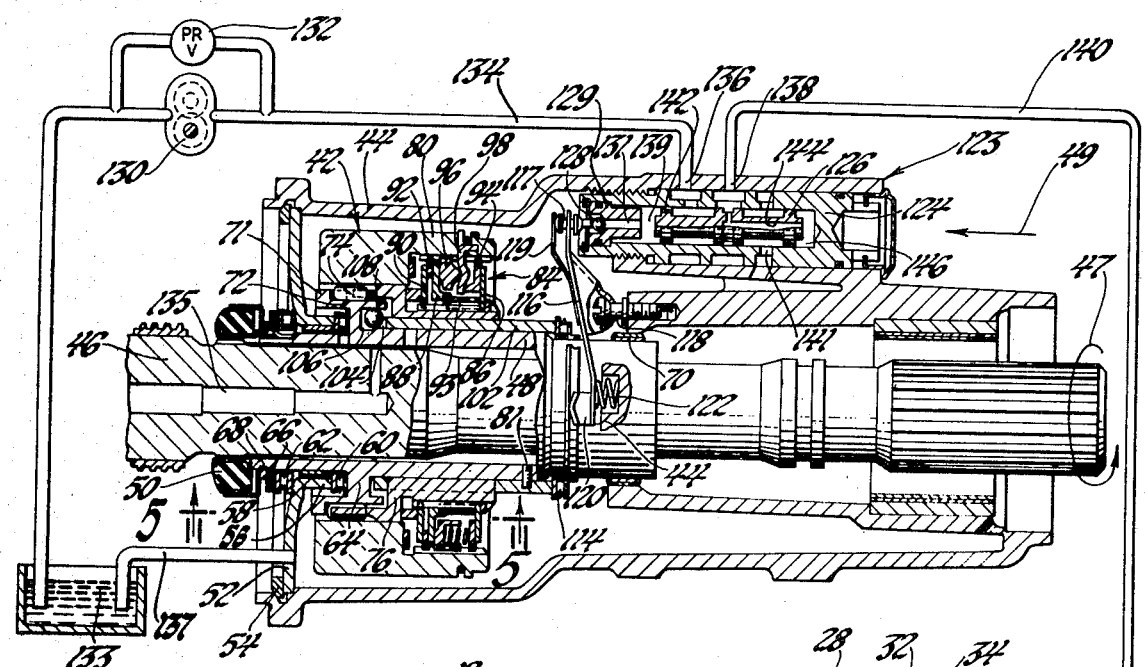
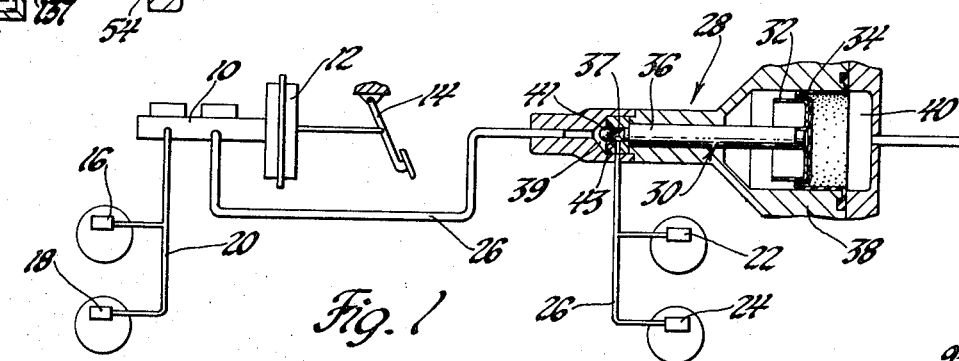
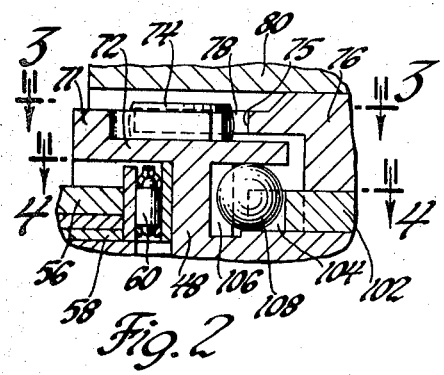
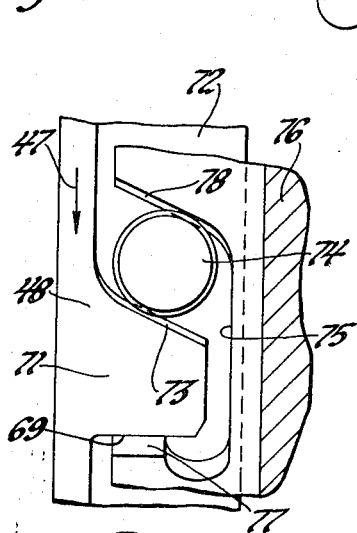
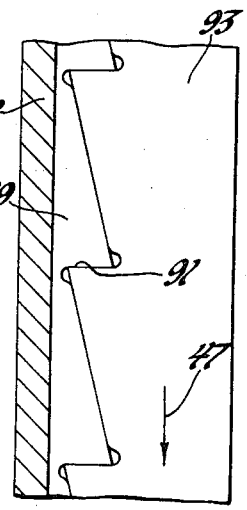
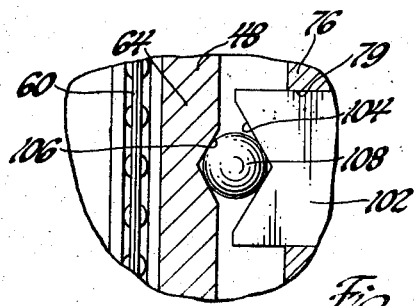
INVENTOR.
Erkki A. Koivunen
BY
D. D. McGraw
ATTORNEY

FULLY COMPENSATED BRAKE ANTI-LOCK SENSOR

The invention relates to vehicle anti-lock braking systems and more particularly to a linear inertia compensated wheel deceleration sensor.

It is desirable for the attainment of optimum braking effectiveness in a vehicle braking system to control the braking pressure to the wheel brake to prevent wheel lockup. In order to attain such a wheel anti-lock control function, it is necessary to provide a mechanism capable of sensing the incipient wheel lock condition and operating a brake pressure modulating mechanism. It is desirable in such an anti-lock sensor, in order to compensate for the widely varying wheel-to-road friction coefficients encountered due to road surface conditions, to provide a device that is responsive to vehicle linear deceleration and vehicle wheel angular deceleration.

Prior art U.S. Patent No. 3,322,471 by Faiver et al, is an example of a linear inertia compensated rotary inertia deceleration sensing mechanism. This prior art device includes a cam arrangement which is responsive to a predetermined differential between the rotational speed of a wheel speed driven member and an inertia weight. The device includes a spring which encircles the wheel speed driven member and urges a clutch plate which is non-rotatably attached to the wheel speed driven member into engagement with the inertia weight. During vehicle braking and consequent vehicle linear deceleration, the spring is compressed in proportion to the linear deceleration induced force acting on the inertia weight, thereby imparting an axial force to the wheel speed driven member which retards operation of the cam arrangement. Consequently, the device actuates the cam arrangement to relieve the braking pressure relatively quickly when the vehicle linear deceleration is small in proportion to wheel angular deceleration and delays the actuation of the cam arrangement when the vehicle linear deceleration is large compared to the wheel angular deceleration.

The present invention is an improvement over the Faiver invention and offers improved performance over the wide range of vehicle deceleration rates which are encountered between the extremes of braking on a relatively high friction coefficient road surface such as dry pavement and a relatively low friction coefficient road surface such as ice. The present invention includes a wheel speed driven rotary member, an inertia weight, and a cam sleeve connected to the rotary member by a roller and ramp cam arrangement and to the inertia weight by a variable capacity clutch. A second cam arrangement is spring-loaded to resist movement between the rotary member and cam sleeve but responds to such movement by actuating a brake pressure modulator. The variable capacity clutch includes a number of levers which are pivoted to the inertia weight and extend radially inward between annular friction members splined to the weight. The linear deceleration induced force on the inertia weight acts through the lever to force the annular friction members in opposing directions, thus increasing the frictional engagement between the annular friction members and abutting friction discs splined to the rotary member. Consequently, during vehicle braking on a high friction coefficient surface whereby a relatively high vehicle linear deceleration is encountered, the variable capacity clutch transmits to the wheel speed driven rotatable member a relatively high torque necessary to actuate the cam arrangement in opposition to the inertia induced force opposing actuation of the cam arrangement. On the other hand, during braking on a relatively low friction coefficient surface, the variable capacity clutch transmits a relatively small torque necessary to overcome the relatively small opposing linear inertia force and then allows the weight to overrun the wheel speed driven rotary member so as to sustain rotary movement of the inertia weight. In this manner the brake release signal can be maintained until the wheel accelerates on the low friction coefficient surface.

In the drawings:

FIG. 1 is a sectional view of the invention including a schematic illustration of the brake anti-lock circuit;

FIG. 2 is an enlargement of a portion of FIG. 1;

FIG. 3 is a sectional view taken in the direction of arrows 3—3 of FIG. 2;

FIG. 4 is a sectional view taken in the direction of arrows 4—4 of FIG. 2; and

FIG. 5 is a sectional view taken in the direction of arrows 5—5 of FIG. 1.

DESCRIPTION OF THE BRAKE SYSTEM

Referring to FIG. 1, a master cylinder 10, illustrated as being of the dual pressure chamber type, a vacuum booster 12, and an operator actuated pedal 14 are arranged in the conventional manner to generate braking pressure. The braking pressure is communicated to a pair of front wheel brakes 16 and 18 through conduit 20 and to a pair of rear wheel brakes 22 and 24 through conduit 26.

A brake pressure modulator 28 is interposed in conduit 26, and is operable to cyclically release and reapply the brake pressure to the rear wheel brakes 22 and 24. The rear wheel brake pressure modulator 24 is of the conventional sort well known in the prior art and includes piston 30 which is formed by a cup 32, a diaphragm 34 and a rod 36. The piston 30 and housing 38 cooperate to form a variable pressure chamber 40. Rod 36 of piston 30 extends sealingly through a portion of housing 38 to form a movable wall of brake pressure chamber 39 which communicates with the master cylinder 10 and the wheel brakes 22 and 24. The piston 30 is viewed in FIG. 1 in its normal position wherein fluid pressure in chamber 40 holds piston 30 leftwardly so that the necked down portion 37 of rod 36 extends into engagement of ball check valve 41 holding it unseated from valve seat 43, thereby establishing free fluid communication through chamber 39 between the master cylinder 10 and the wheel brakes 22 and 24. A reduction of the fluid pressure in variable pressure chamber 40 allows the brake fluid pressure acting on the end of rod 36 to move the piston 30 rightwardly sequentially seating the check valve 41 to isolate the master cylinder from the wheel brakes and withdrawing brake fluid from the wheel brakes 22 and 24. A subsequent increase of the pressure in variable volume chamber 40 returns piston 30 leftwardly to reapply the brake pressure and unseats check valve 41 to reestablish fluid communication between the master cylinder 10 and the rear wheel brakes 22 and 24.

DESCRIPTION OF THE SENSOR

The fully compensated brake anti-lock sensor indicated generally at 42 operates to pressurize the variable volume chamber 40 of modulator 28 in accordance with the sensed wheel condition. The sensor 42 is housed in the transmission case 44, through which the transmission output shaft 46 extends. The transmission output shaft 46 is connected at the rearward end thereof to the rear wheels and so rotates at a speed proportional to that of the average rear wheel speed. The arrow designated 47 indicates the direction of shaft rotation associated with vehicle movement in the forward direction indicated by arrow 49. Annular drive sleeve 48 encircles the transmission output shaft 46 and is drivingly coupled thereto by vibration dampening coupling 50. A bulkhead 52 is seated at the transmission case 44 by snap ring 54 and extends radially inward to form a wall portion 56 which extends co-axially with the transmission output shaft 46. An annular bearing 58 rotatably mounts the forward end of the annular sleeve 48 in the wall portion 56 of bulkhead 52. Thrust bearings 60 and 62 abut the ends of the wall portion 56 and respectively engage the radially extending shoulder 64 of drive sleeve 48 and a heavy wavy spring 66 which is attached to drive sleeve 48 by snap ring 68 so as to hold the drive sleeve 48 free of end play. The rearward end of drive sleeve 48 is rotatably mounted in the transmission case 44 by bearing 70. The drive sleeve 48 includes a generally axially extending outer portion 72 on which a radially raised abutment 71 is formed to provide an axially extending abutment surface 69 and a cam surface 73 which extends angularly with respect to the axis of rotation as best shown in FIG. 3. A plurality of these radially raised abutments 71 are spaced circumferentially about the drive sleeve 48, each providing an abutment surface 69 and a cam surface 73.

A cam sleeve 76, annular in shape, encircles the drive sleeve 48. The forward end of cam sleeve 76 includes a number of notches 75 which are spaced circumferentially at intervals corresponding to the spacing of the radially raised abutments 71 of drive sleeve 48. As best shown in FIG. 3, one side 77 of each notch 75 extends parallel to the axis of rotation and is engageable with the abutment surface 69 of drive sleeve 48 so as to form a driving connection between the drive sleeve 48 and cam sleeve 76 when the transmission output shaft 46 and drive sleeve 48 attached thereto are accelerating in the direction of arrow 47. The other side 78 of each notch 75 extends angularly with respect to the axis of rotation to form a cam surface which matches that of cam surface 73 but is circumferentially spaced therefrom. A roller 74 is located on the drive sleeve 48 and between each of the cam surfaces 73 and 78 so that when a sufficient torque is applied to the cam sleeve 76 in the direction of arrow 47 the cam sleeve 76 is moved both rotationally and axially relative to the drive sleeve 48. This axial movement of cam sleeve 76 is limited by its engagement with a stop pin 81 which is forced fitted into drive sleeve 48 and extends radially therefrom.

Referring to FIGS. 2 and 4, the inner bore of the cam sleeve 76 includes a number of circumferentially spaced axially extending slots 79 through which cam bars 102 extend. The cross section of cam bars 102 is an arcuate shape adapted to match the engaging arcuate outer surface of drive sleeve 48 and the arcuate inner surface of cam sleeve 76. The forward end of cam bars 102 form a cam surface 104 adapted to engage a ball 108 situated between the cam bar surface 104 and a cam surface 106 formed on the rearward side of shoulder 64 of drive sleeve 48. Upon relative rotary motion between the drive sleeve 48 and cam sleeve 76, ball 108 and the engaging cam surfaces 104 and 106 act to displace the cam bars 102 rearwardly. The rearward end of cam bars 102 abut a thrust bearing assembly 114 which encircles the drive sleeve 48.

A valve actuating lever 116 is fulcrumed at screw 118 and is generally Y-shaped having an abutment 120 engaging the thrust bearing 114 at diametrically opposed points. Springs 122 seated in the transmission case 44 engage the lever mechanism adjacent the abutment 120 and urge lever mechanism 116, thrust bearing 114 and cam bars 102 in a forward direction. The spring 122 acts through the cam bars 102 and balls 108 to provide a predetermined force which retards relative movement between drive sleeve 48 and cam sleeve 76. The lever mechanism 116 pivots about screw 118 to operate the anti-lock control valve, indicated generally at 123, which in turn operates the modulator 28 as will be hereinafter described.

An inertia weight 80, annular in shape, encircles the cam sleeve 76 and is connected thereto by a variable capacity clutch indicated generally at 84. The variable capacity clutch 84 includes annular discs 86, 88, and 90. The rearwardmost disc 86 and forwardmost disc 90 include radially inward extending tabs which slidably engage axially extending grooves in the cam sleeve 76, and also engage the cam sleeve 76 in a manner which restrains axially outward movement of the discs. The central disc 88 includes, as best shown in FIG. 5, integrally formed circumferentially spaced ratchet teeth 89 which engage matching ratchet teeth 91 on a ring 93 which includes radially inward extending tabs which slidably engage the axially extending grooves in the cam sleeve 76. A friction member 92 is located between the discs 88 and 90 and includes radially outward extending tabs which slidably engage axially extending grooves in weight 80. Annular friction members 94 and 96 of irregular cross section are similarly affixed to weight 80 and are located between and respectively engage discs 86 and 88. A number of radially inward extending circumferentially spaced levers 98 are pivotally affixed to weight 80 and extend between and into engagement with the irregularly shaped friction members 94 and 96. The sensor mechanism is lubricated via the transmission lube passage 135.

SENSOR OPERATION

During wheel angular acceleration and consequent vehicle linear acceleration, the drive sleeve 48, which is attached to the transmission output shaft by the vibration dampening coupling 50, drives the cam sleeve 76 through the engagement of abutment surfaces 69 and 77. The cam sleeve 76 in turn drives the weight 80 through the variable capacity clutch 84. As best shown in FIG. 5, acceleration of the cam sleeve 76 and the ring member 93 rotating therewith acts through the inclined surface of the engaged ratchet teeth 91 and 89 to urge friction disc 88 forwardly into torque carrying engagement with the friction member 92. Thus, the torque carrying capacity of the variable capacity clutch 84 is increased in proportion to the rate of wheel angular acceleration. In this manner the variable capacity clutch minimizes the amount by which the speed of weight 80 lags behind that of the transmission output shaft 46. In this manner the weight 80 responds quickly to acceleration of the transmission output shaft 46.

When the vehicle operator actuates the brakes, the vehicle wheels decelerate and the vehicle responds by decelerating linearly to an extent dependent upon the wheel-to-road friction coefficient. Deceleration of the rear wheels causes the transmission output shaft 46 and the drive sleeve 48 attached thereto to decelerate. The weight 80 tends to continue rotating in the direction of arrow 47 by virtue of its rotary inertia and tends to continue moving forward in the direction of arrow 49 by virtue of its linear inertia. The linear inertia of the weight 80 induces an axial force in the direction of arrow 49 which is multiplied by the levers 98 and forces the irregularly shaped friction members 94 and 96 axially outward to provide a torque carrying capacity in the clutch 84 which is proportional to the magnitude of the linear deceleration of the vehicle. It is noted that during wheel deceleration the axially extending surfaces of ratchet teeth 89 and 91 engage so that they are rotatably fixed relative to each other. The torque induced by the rotary inertia of weight 80 is transmitted through clutch 84 to the cam sleeve 76, and through the cooperation of cam surfaces 73 and 78 with the rollers 74 urges the cam sleeve 76 to move axially and rotatably relative to the drive sleeve 48. Inasmuch as the outer friction discs 86 and 90 are axially restrained, the clutch 84 also acts to transmit the linear inertia induced axially acting force from weight 80 to the cam sleeve 76. The springs 122 act through the lever mechanism 116, thrust bearing 14, cam bars 102, and cam surfaces 104 and 106 to provide a predetermined force which also resists relative movement between the drive sleeve 48 and the cam sleeves 76. When the rotary inertia induced torque transmitted to the cam sleeve is sufficient to overcome the combined movement-resisting forces of the linear inertia of the weight 80 and of springs 122, the cam sleeve 76 moves rotatably and axially relative to the drive sleeve 48 and actuates lever mechanism 116. The clutch 84 is designed to slip when the rotary inertia induced torque exceeds that amount necessary to move cam sleeve 76 and so conserves the rotary inertia of weight 80.

If the vehicle is traveling on a relatively high friction coefficient road surface when the brakes are applied, a relatively large torque will be required to move the cam sleeve 76 in opposition to the linear inertia induced force and the force of springs 122. Since the torque carrying capacity of clutch 84 is proportionate to the linear deceleration, the sensor is, dependent of course upon an appropriate selection of inertia weights, cam angles and spring capacities, sensitive to the incipient wheel lock condition. On the other hand, if the braking is initiated while the vehicle is traveling on a low friction coefficient road surface, the vehicle linear deceleration attained is relatively low. Therefore, the linear inertia force acting in the forward direction on weight 80 results in a relatively low torque capacity in clutch 84 so that a relatively low torque is transmitted to the cam sleeve with the result that the rotary inertia of weight 80 is sustained for a considerably longer time than is the case during rapid linear vehicle deceleration. Since the inertia force opposing the rotary movement of cam sleeve 76 is small, the relatively low torque transmitted through the variable capacity clutch 84 adjusts the sensitivity of the sensor mechanism to the low friction coefficient road surface and causes relative movement between the cam sleeve 76 and drive sleeve 48 when the incipient wheel lock condition is reached.

ANTI-LOCK SYSTEM OPERATION

The anti-lock control valve 123 functions in response to sensor actuation of lever mechanism 116 to sequentially decrease the pressure in variable pressure chamber 40 of modulator 28 to release the brake and increase the pressure in variable pressure chamber 40 to reapply the brake. The control valve 123 receives through conduit 134 fluid pressure from a pump 130 having a conventional pressure relief valve 132. While pump 130 is illustrated as being an automatic transmission pump, any hydraulic pressure source of adequate capacity may be utilized. The anti-lock control valve 123 includes generally a housing 124 forming a chamber in which a valve spool 126 is slidable. The fluid pressure in conduit 134 is received at valve inlet port 136. The valve outlet port 138 communicates fluid pressure through conduit 140 to variable pressure chamber 40 of the modulator 28. The anti-lock control valve 123 is depicted in FIG. 1 in the normal braking condition wherein the pump pressure at inlet port 136 and the modulator piston supporting pressure at outlet port 138 balance the valve spool 126 in a centered position. The pump pressure at valve inlet port 136 is communicated through orifice 142 to chamber 139 at the forward end of valve spool 126. The pump pressure acts on the forward end of the valve spool 126 to provide a rearward acting force. The modulator supporting pressure at valve outlet port 138 is communicated through the passage 144 in valve spool 126 to chamber 146 where it acts on the rearward end of the valve spool 126 providing a forward acting force. A passage 131 in the housing closure member 129 at the leftward end of valve housing 124 vents the chamber 139 to the transmission sump 133 through passage 137 in the bulkhead 52. A ball valve 128 is held seated against the valve housing closure member 129 by the lever mechanism 116 during normal braking. A vibration dampening assembly including a spring finger 119 and a button 117 is attached to lever mechanism 116 and isolates the ball valve 128 from vibrations of lever mechanism 116.

When the fully compensated sensor 42 signals an incipient wheel lock the lever mechanism 116 is pivoted about fulcrum screw 118 thereby removing the seating force from ball valve 128. The fluid pressure in chamber 139 unseats ball valve 128 from closure member 129. Consequently, the pressure in chamber 139 is exhausted through passage 131 at a flow rate exceeding that of orifice 142. The reduced pressure in chamber 139 permits the modulator supporting pressure in chamber 146 to move spool 126 leftwardly from the centered position of FIG. 1 whereby the modulator supporting pressure at valve outlet port 138 is exhausted to the transmission reservoir 133 through exhaust port 141 and passage 137. The resulting pressure decrease in variable pressure chamber 40 releases the wheel brakes 22 and 24 as hereinbefore described. When the impending wheel lock condition has been arrested, the lever mechanism 116 seats ball valve 128. The pump pressure at valve inlet port 136 is metered through fixed orifice 142 causing a pressure buildup in chamber 139 which acts on the leftward end of valve spool 126. Valve spool 126 is consequently moved rightwardly establishing fluid communication between valve inlet port 136 and valve outlet port 138 whereby pump pressure is communicated to the variable pressure chamber 40 of modulator 28. When the valve spool 126 has again reached its balanced position, the fluid pressure in variable pressure chamber 40 will have acted as hereinbefore described to reapply the brakes 22 and 24.

It is noted that brake actuation during backwards movement of the vehicle results in a linear inertia induced force which would tend to move cam sleeve 76 rearwardly relative to the drive sleeve 48. Spring 122 offers a sufficient force to resist this inertia force and so prevents a false initiation of the anti-lock cycle.

It is noted that while the fully compensated brake anti-lock sensor of this invention is herein disclosed as encircling and being driven from the transmission output shaft, it is within the scope of this invention to drive the fully compensated brake anti-lock sensor at the speed of the controlled wheels by any equivalent means.

I claim:

1. A sensor device for a vehicle brake anti-lock control system comprising:
    a drive sleeve aligned substantially with the vehicle longitudinal axis and rotatably driven at a speed proportional to the vehicle wheel speed;
    a cam sleeve;
    cam means acting between the drive sleeve and the cam sleeve, the cam means forming a driving connection therebetween during vehicle wheel angular acceleration and inducing limited relative rotational and axial movement therebetween when torque is transmitted from the cam sleeve to the drive sleeve during vehicle wheel angular deceleration;
    an inertia weight means;
    means acting between the weight means and the cam sleeve to accelerate the weight means with the cam sleeve during wheel angular acceleration;
    clutch means acting between the weight means and the cam sleeve and during vehicle wheel angular deceleration transmitting to the cam sleeve a rotary inertia induced torque which acts to move the cam sleeve relative to the drive sleeve and a vehicle linear deceleration induced force which retards relative movement between the drive sleeve and the cam sleeve, the clutch means being variable in capacity in response to the induced inertia force whereby the rotary inertia induced torque acting on the cam sleeve is modulated by the vehicle linear deceleration;
    and means responsive to relative movement between the drive sleeve and cam sleeve to operate a brake pressure modulator.

2. A sensor device for a vehicle brake anti-lock control system comprising:
    a drive sleeve aligned substantially with the vehicle longitudinal axis and rotatably driven at a speed proportional to the vehicle wheel speed;
    a cam sleeve;
    cam means acting between the cam sleeve and the drive sleeve, the cam means forming a driving connection therebetween during vehicle wheel angular acceleration and inducing limited relative rotational and axial movement therebetween when torque is transmitted from the cam sleeve to the drive sleeve during vehicle wheel angular deceleration;
    an inertia weight means including a plurality of circumferentially spaced radially inward extending levers pivoted thereto;
    means acting between the weight means and the cam sleeve to rotatably drive the weight means during wheel angular acceleration;
    clutch means acting between the weight means and the cam sleeve and cooperable with the levers to vary the torque carrying capacity of the clutch means in proportion to the linear deceleration induced inertia force, the clutch means including,
        a plurality of annular discs axially slidably connected to either the weight means or the cam sleeve, the forwardmost and rearwardmost annular friction discs being axially restrained in at least the outward direction,
        a plurality of annular friction members attached to the other of the weight means or cam sleeve in a manner permitting axial movement and being located between the annular friction discs, one of the annular friction members including a separate forward portion and rearward portion, the respective portions being engaged by the levers whereby a linear deceleration induced force acting on the levers urges the friction members into torque carrying engagement with the annular discs whereby the magnitude of vehicle linear deceleration determines the torque transmitted to the cam sleeve;
    and means responsive to relative movement between the drive sleeve and the cam sleeve to operate a brake pressure modulator.

3. A sensor device for a vehicle brake anti-lock control system comprising:
    a housing;
    a drive sleeve rotatably mounted in the housing and aligned substantially with the vehicle longitudinal axis;
    means driving the drive sleeve at a speed proportional to the wheel speed;
    a cam sleeve rotatably mounted in the housing;
    first cam means acting between the drive sleeve and the cam sleeve to form a driving connection therebetween during wheel angular acceleration and to cause relative rotary and axial movement of the cam sleeve relative to the drive sleeve when during wheel deceleration a determined torque acts on the cam sleeve;
    cam bar means keyed to the cam sleeve for rotation therewith and axial movement relative thereto;
    second cam means acting between the drive sleeve and cam bar means for causing relative axial movement therebetween when the cam sleeve rotates relative to the drive sleeve;

spring means acting on the cam bar means and through the second cam means providing a predetermined force resisting rotary movement between the drive sleeve and cam sleeve;

inertia weight means;

variable capacity clutch means acting between the cam sleeve and the weight means and including ratchet means effective to increase the torque carrying capacity during wheel angular acceleration so the weight is accelerated with the cam sleeve, lever means pivoted to the inertia weight means and effective to increase the torque capacity during wheel angular deceleration in proportion to the vehicle linear deceleration whereby a rotary inertia induced torque acts on the cam sleeve in proportion to the linear deceleration, and the clutch means providing an axial force transmitting link between the weight means and the cam sleeve whereby the linear deceleration induced force on the weight means acts to resist movement of the cam sleeve relative to the drive sleeve;

and means responsive to axial movement of the cam bar means to modulate braking pressure.

4. A sensor device for a vehicle brake anti-lock control system comprising:

a housing;

a drive sleeve rotatable in the housing and aligned substantially with the vehicle longitudinal axis; the drive sleeve being connected to a portion of the vehicle drive train for rotation therewith and having a cam surface and an abutment surface thereon;

a cam sleeve rotatable in the housing and having an abutment surface engaging the abutment surface of the drive sleeve to form a driving connection therebetween during wheel acceleration and a cam surface;

roller means engaging the respective cam surfaces of the drive sleeve and cam sleeve and effective to cause axial and rotary movement therebetween when a determined torque is transmitted from the cam sleeve to the drive sleeve;

spring means providing a predetermined force acting to resist relative movement between the drive sleeve and cam sleeve;

an annular weight rotatable on the cam sleeve and including a plurality of circumferentially spaced radially inwardly extending levers pivoted thereto;

clutch means acting between the weight and the cam sleeve and including a plurality of friction discs alternately splinedly attached to the weight and the drive sleeve, the outermost friction discs being restrained from axially outward movement, one of the friction discs having separate forward portion and rearward portion and being engageable with the adjacent friction discs, the separate forward and rearward portions being of irregular cross section and being engaged by the levers and cooperable therewith to force the annular friction discs into torque carrying engagement proportional to the linear deceleration induced force acting on the inertia weight, and one of the friction discs including integrally formed ratchet means effective to urge the friction discs into torque carrying engagement in proportion to the inertia lag of the weight with respect to the cam sleeve during vehicle wheel acceleration;

and means responsive to relative movement between the drive sleeve and the cam sleeve to operate a brake pressure modulator.

* * * * *